United States Patent
Olarig et al.

(10) Patent No.: US 6,230,225 B1
(45) Date of Patent: May 8, 2001

(54) METHOD AND APPARATUS FOR MULTICASTING ON A BUS

(75) Inventors: Sompong P. Olarig, Cypress; Thomas J. Bonola, Tomball, both of TX (US)

(73) Assignee: Compaq Computer Corp., Houston, TX (US)

( * ) Notice: Subject to any disclaimer, the term of this patent is extended or adjusted under 35 U.S.C. 154(b) by 0 days.

(21) Appl. No.: 09/203,083

(22) Filed: Dec. 1, 1998

(51) Int. Cl.[7] .................................................. G06F 13/00
(52) U.S. Cl. .............................................................. 710/128
(58) Field of Search ..................................... 710/100, 109, 710/107, 106, 126, 128, 129

(56) References Cited

U.S. PATENT DOCUMENTS

| | | | | |
|---|---|---|---|---|
| 5,829,033 | * | 10/1998 | Hagersten et al. ..................... | 711/141 |
| 5,862,148 | * | 1/1999 | Typaldos et al. ..................... | 371/22.1 |
| 6,052,151 | * | 4/2000 | Tanaka ................................. | 348/467 |

OTHER PUBLICATIONS

Mendel, Brett; "Server I/O all set to flow"; *Lantimes*, Oct. 27, 1997, vol. 14, Issue 22; cover page and p. 31.

Briggs, Chris; "Smarter and Faster I/O for Servers"; CORE: Operating Systems; *Byte*, May 1, 1996, vol. 2, No. 5.

Thompson, Tom; "I2O Beats I/O Bottlenecks"; *Byte*, Aug. 1997, pp. 85, 86 and 3 additional pages.

I2O Introduction; Technology Backgrounder; Aug. 13, 1997; http://www.i2osig.org/Architecture/TechBack.html.

i960®RP I/O Processor—the I2O SIG site; http://134.134.214.1/design/iio/i2osig.html; Feb. 6, 1998.

"Welcome to the I2O SIG® Web Site!"; http://www.i2osig.org; Feb. 6, 1998.

"About I2O Technology"; http://www.i2osig.org/Architecture; Feb. 6, 1998.

"Technology Backgrounder"; http://www.i2org/Architecture/TechBack.html; Feb. 6, 1998; 6 pages.

"Questions and Answers"; http://www.i2osig.org/Architecture/QandA.html; Feb. 6, 1998; 4 pages.

"I2O® Specifications For Non–Members"; http://www.i2osig.org/Architecture/GetSpec.html; Feb. 6, 1998.

Amdahl, Carlton G.; "I2O Future Directions"; http://www.i2osig.org; Jun. 1996; 12 pages.

Goble, Scott, et al.; "Intelligent I/O Architecture"; http://www.i2osig.org; Jun. 1996; 22 pages.

"Press Releases and Clips"; http://www.i2osig.org/Press; Feb. 6, 1998; 4 pages.

Listing of Press Releases ; http://altavista.digital.com/cgi–bin/quer . . . =21%2FMar%2F86&d1=&search.x=46&search.y=6; Feb. 6, 1998; 2 pages.

Crothers, Brooke; "Intel server chip gets big backing", Oct. 7, 1997; http://www.news.com/New/Item/0,4,14962,00.html; Feb. 6,1998.

(List continued on next page.)

*Primary Examiner*—Ario Etienne
(74) *Attorney, Agent, or Firm*—Fletcher, Yoder & Van Someren

(57) ABSTRACT

A method and apparatus for broadcasting data to multiple target devices during a single bus transaction. Each of a plurality of potential target devices detect the beginning of a primary bus transaction and retrieve transaction command and target device identification information from a multicast bus. The transaction command information and target device identification information are decoded. A determination is made by each device as to whether the decoded target device identification information matches the identity of the device and furthermore whether the decoded transaction command is a read command. If the target device identification information matches the identity of the device and the command is a read, the device writes data present on the primary device into the device.

20 Claims, 3 Drawing Sheets

OTHER PUBLICATIONS

"HP Demonstrates Commitment to I2O Standard With New I2O Disk–array Controller"; *Hewlett Packard*; Press Release, Atlanta, Oct. 8, 1997; http://hpcc920.external.hp.com/pressrel/oct97/08oct97b.html; Feb. 6, 1998; 2 pages.

"I2O: Disaster in the making for the freeware community"; http://22.kenandted.com/i2o/disaster.html; Feb. 6, 1998; 2 pages.

\* cited by examiner

METHOD AND APPARATUS FOR MULTICASTING ON A BUS

FIELD OF THE INVENTION

The present invention pertains in general to the implementation of a computer system bus, and more particularly, but not by way of limitation, to a method and apparatus for multicasting on a computer system bus wherein information from a single bus master is broadcast to multiple targets during a single bus transaction.

BACKGROUND OF THE INVENTION

Computer systems have achieved wide usage in modern society. During operation, a computer system processes and stores data at a speed and at a level of accuracy many times that which can be performed manually. Successive generations of computer systems have permitted ever-increasing amounts of data to be processed at ever-increasing rates.

Computer systems are sometimes operated as stand-alone devices or connected together by way of network connections, typically together with a network server, to form a computer network. When networked together, communication between the separate computer systems is possible. Files and other data, stored or generated at one computer system, can be transferred to another computer system.

A conventional computer system typically includes one or more Central Processing Units (CPUs) capable of executing algorithms forming applications and a computer main memory. Peripheral devices, both those embedded together with a CPU or constructed to be separate therefrom, also typically form portions of a conventional computer system. Computer peripheral devices include, for instance, video graphics adapters, Local Area Network (LAN) interfaces, Small Computer System Interface (SCSI) bus adapters, and mass storage devices, such as disk drive assemblies.

A computer system further typically includes computer buses which permit communication of data between various portions of the computer system. For example, a host bus, a memory bus, at least one high-speed bus, a local peripheral expansion bus, and one or more additional peripheral buses form portions of a typical computer system.

A peripheral bus is formed, for instance, of an SCSI bus, an Extension to Industry Standard Architecture (EISA) bus, an Industry Standard Architecture (ISA) bus, or a Peripheral Component Interface (PCI) bus. The peripheral bus forms a communication path to and from a peripheral device connected thereto. The computer system CPU, or a plurality of CPUs in a multi-processor system, communicates with a computer peripheral device by way of a computer bus, such as one or more of the computer buses noted above.

A computer peripheral, depending upon its data transfer speed requirements, is connected to an appropriate peripheral bus, typically by way of a bus bridge that detects required actions, arbitrates, and translates both data and addresses between the various buses.

A computer peripheral device forming a portion of a single computer system might well be supplied by a manufacturer other than the manufacturer of the computer CPU. If the computer system contains more than one peripheral device, the peripheral devices might also be supplied by different manufacturers. Furthermore, the computer system may be operable pursuant to any of several different operating systems. The various combinations of computer peripheral devices and computer operating systems of which a computer system might be formed quickly becomes quite large.

Software drivers are typically required for each computer peripheral device to effectuate its operation. A software driver must be specifically tailored to operate in conjunction with the particular operating system operating on the computer. A multiplicity of software drivers might have to be created for a single computer peripheral to ensure that a computer peripheral device is operable together with any of the different operating systems.

The complexity resulting from such a requirement has led, at least in part, to the development of an Intelligent Input/Output ($I_2O$) standard specification. The $I_2O$ standard specification sets forth, inter alia, standards for an I/O device driver architecture that is independent of both the specific peripheral device being controlled and the operating system of the computer system to which the device driver is to be installed.

In the $I_2O$ standard specification, the portion of the driver that is responsible for managing the peripheral device is logically separated from the specific implementation details of the operating system with which is to be installed. Because of this, the part of the driver that manages the peripheral device is portable across different computer and operating systems. The $I_2O$ standard specification also generalizes the nature of communication between the host computer system and peripheral hardware; thus, providing processor and bus technology independence.

Regardless of which bus protocol is deployed in a computer system or whether the computer system is $I_2O$ compliant, devices frequently employ bus master/slave functionality to communicate across a computer system bus. In a typical bus transaction, a single bus master sends information, including, but not limited to, address, data and control information to a single target device operating as a slave during a single bus transaction. In certain situations, however, it is desirable to broadcast the information to multiple targets. For example, in a fault—tolerant environment it is desirable to perform fast backup of data such as by providing mirrored disk drives. Conventional methods for broadcasting information to multiple targets requires moving the information multiple times using multiple bus transactions.

It would be advantageous therefore, to devise a method and apparatus which would effectuate low-latency distribution of data to multiple devices. It would further be advantageous if such a method and apparatus provided multicasting on a computer system bus wherein information from a single bus master is broadcast to multiple targets during a single bus transaction.

SUMMARY OF THE INVENTION

The present invention comprises a method and apparatus for broadcasting data to multiple target devices during a single bus transaction. Each of a plurality of potential target devices detect the beginning of a primary bus transaction and retrieve transaction command and target device identification information from a multicast bus. The transaction command information and target device identification information are decoded. A determination is made by each device as to whether the decoded target device identification information matches the identity of the device and furthermore whether the decoded transaction command is a read command. If the target device identification information matches the identity of the device and the command is a read, the device writes data present on the primary device into the device.

BRIEF DESCRIPTION OF THE DRAWINGS

A more complete understanding of the present invention may be had by reference to the following Detailed Description and appended claims, when taken in conjunction with the accompanying Drawings wherein:

DETAILED DESCRIPTION

Figure 1:
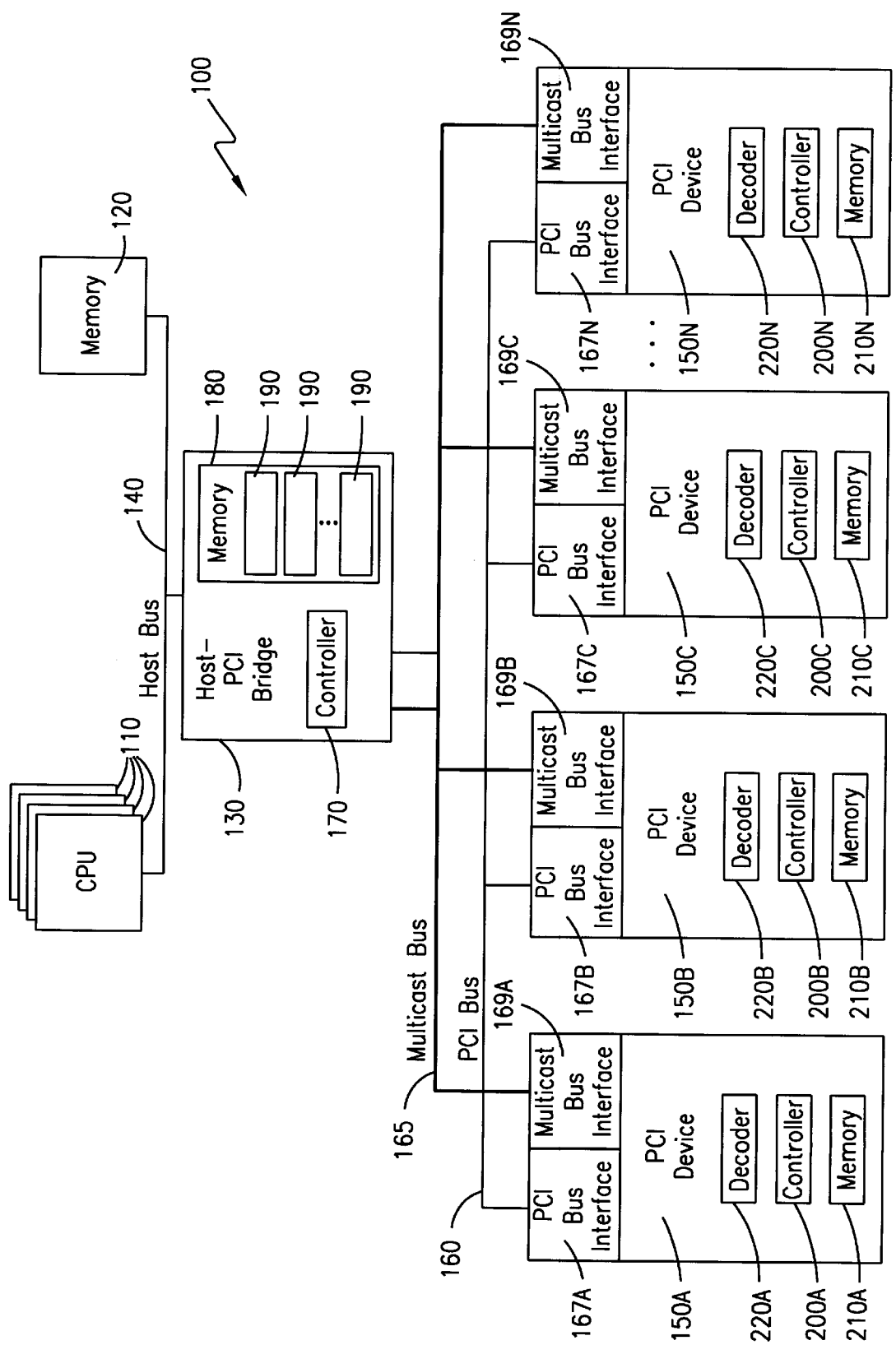
FIG. 1 is a functional block diagram of an apparatus for effectuating multicasting on a computer system bus.

Referring now to FIG. 1, there is illustrated a functional block diagram of an apparatus, shown generally at 100, for effectuating multicasting on a computer system bus. A plurality of host CPUs I 10, a host memory 120, a host to PCI bridge 130 and other devices (not shown) typically associated with a host computer system communicate with one another across a host bus 140. The host to PCI bridge and a plurality of PCI devices 150A–N communicate with one another across a PCI bus 160. The PCI devices 150A–N can be located on a mother board together with the host CPUs I 10 or can be located off of the mother board separate from the host CPUs I 10. Communication between devices on the host bus 140 and devices on the PCI bus 160 is effectuated via the host to PCI bridge 130 in a manner well known in the industry. Furthermore, as will be described in greater detail, information is broadcast from devices on the host bus 140, for example the host CPU I 10, to multiple PCI devices 150A–N across the PCI bus 160 via the host to PCI bridge 130 in conjunction with a multicast bus 165.

The host to PCI bridge 130 is controlled by a controller 170 and includes a memory 180 which among other uses, contains a plurality of configuration registers 190.

Each PCI device 150A–N includes an PCI bus interface 167A–N and a multicast bus interface 169A–N for interfacing to the PCI bus 160 and the multicast bus 165 respectively. Each PCI device 150A–N is controlled by an associated controller 200A–N and includes an associated memory 210A–N. Command information and target identification information communicated across the multicast bus 165 to the PCI devices 150A–N is decoded by the PCI devices 150AN using an associated decoder 220A–N.

Figure 2:
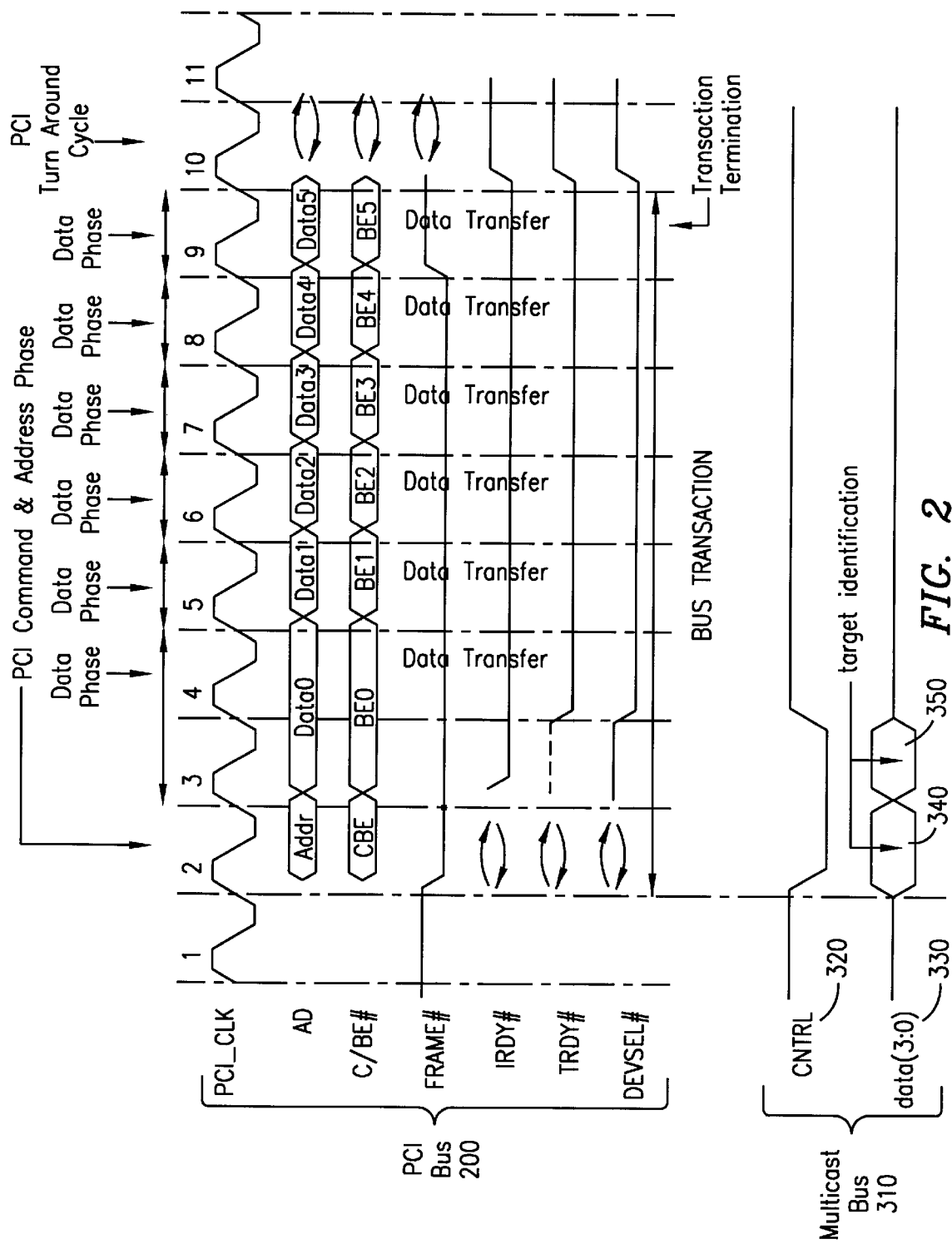
FIG. 2 is a timing diagram for effectuating multicasting on a computer system bus consistent with the apparatus described in FIG. 1.

Referring additionally now to FIG. 2, there is illustrated a timing diagram for effectuating multicasting on a computer system bus consistent with the apparatus described in FIG. 1. FIG. 2 illustrates signals 300 associated with a PCI bus write data transaction and signals 310 associated with the multicast bus 165 to effectuate multicasting of the data which is the subject of the data write transaction. The signals 300 associated with the PCI bus 165 are synchronous with the signals 310 of the multicast bus 165 as depicted in FIG. 2.

In the preferred embodiment of the present invention, the multicast bus 310 comprises a control signal (CNTRL) 320 and four data lines (data (3:0)) 330. A transition of the control signal (CNTRL) 320 from a high state to a low state indicates the beginning of a bus transaction and the four data lines (data (3:0)) 330 during a multicast bus command cycle identify a command 340 which is to be performed followed by a target identification 350, present during a multicast bus target identification cycle, identifying one or more PCI or device(s) 150A–N which are targets of the multicast.

When the control signal (CNTRL) 320 transitions from a high state to a low state each of the PCI devices 150A–N reads the command 340 from data lines (data (3:0)) 330. On the subsequent clock cycle each PCI device 150A–N reads the target identification 350 from data lines (data (3:0)) 330. The associated decoder 220A–N of each PCI device 150A–N decodes the command 340 and the target identification 350. If the decoded command 340 is a write operation and the decoded target identification 350 matches the identity of the particular PCI device 150A–N, the particular PCI device 150A–N reads the data present on the PCI bus 160 during the appropriate data phases of the PCI bus transaction. The target identification 350 can identify a single PCI device or, by designing the decoders 220A–N to recognize a range of PCI devices identities, the target identification 350 can identify more than one target PCI device 150A–N resulting in multiple devices reading the data from the PCI bus 160.

In an alternative embodiment, the control signal (CNTRL) 320 is eliminated and a transition from a high state to a low state of the Frame# signal on the PCI bus 160 is used to identify the beginning of a bus transaction. Furthermore, the number of data lines comprising (data (3:0)) 330 can be any number of data lines and need not be set to four data lines. Still further, each of the data lines comprising (data (3:0)) 330 can be associated with a particular command so that activation of the particular data line during a command phase is indicative of the particular command. Likewise, each of the data lines comprising (data (3:0)).330 can be associated with a particular PCI device 150A–N so that activation of the particular data line or lines during a target identification phase indicates the particular PCI device(s) 150A–N which are the intended target(s). Such a dedicated use of the data lines (data (3:0)) eliminates the need for decoders 220A–N. While the preferred embodiment of the present invention describes the present invention as it applies to PCI devices on a PCI bus using PCI protocol, it is understood that the present invention is equally applicable to other types of devices on various types of busses using other protocols.

As an example of the implementation and use of the present invention, PCI device 150A is designated as an active PCI device and PCI device 150B is designated as a mirroring or failover device in a duplex configuration. In this configuration, the two PCI devices 150A–B are essentially identical. The Basic Input Output System (BIOS) sets up configuration registers 190 in the memory 180 of the host to PCI bridge 130. When a device on the host bus 140, for example the host CPU 110, needs to write data into PCI device 150A, the host to PCI bridge 130 activates both the multicast bus 165 and the PCI bus 160 simultaneously to inform the PCI device 150B to update the PCI data that is destined to PCI device 150A on the PCI bus 160. In this example, the bus bandwidth consumption is reduced by half since the host to PCI bridge 130 performs a single write transaction instead of having to perform separate write transactions to PCI device 150A and PCI device 150B.

In another example of the implementation and use of the present invention, PCI device 150A is designated as an active PCI device and PCI device 150B is designated as a fast backup device. In this configuration, the two PCI devices 150A–B are not the same. For example, PCI device 150A is a disk controller and PCI device 150B is a tape controller. The BIOS sets up configuration registers 190 in the memory 180 of the host to PCI bridge 130. When a device on the host bus 140, for example the host CPU I 10, needs to write data into PCI device 150A, the host to PCI bridge 130 activates both the multicast bus 165 and the PCI bus 160 simultaneously to inform the PCI device 150B to update the PCI data that is destined to PCI device 150A on the PCI bus 160. In this example, the bus bandwidth consumption is reduced by half since the host to PCI bridge 130 performs a single write transaction instead of having to perform separate write transactions to PCI device 150A and PCI device 150B. Furthermore, in this configuration, a system administrator dynamically backs up the system in real time and there is no need for system downtime to perform scheduled backups.

Figure 3:
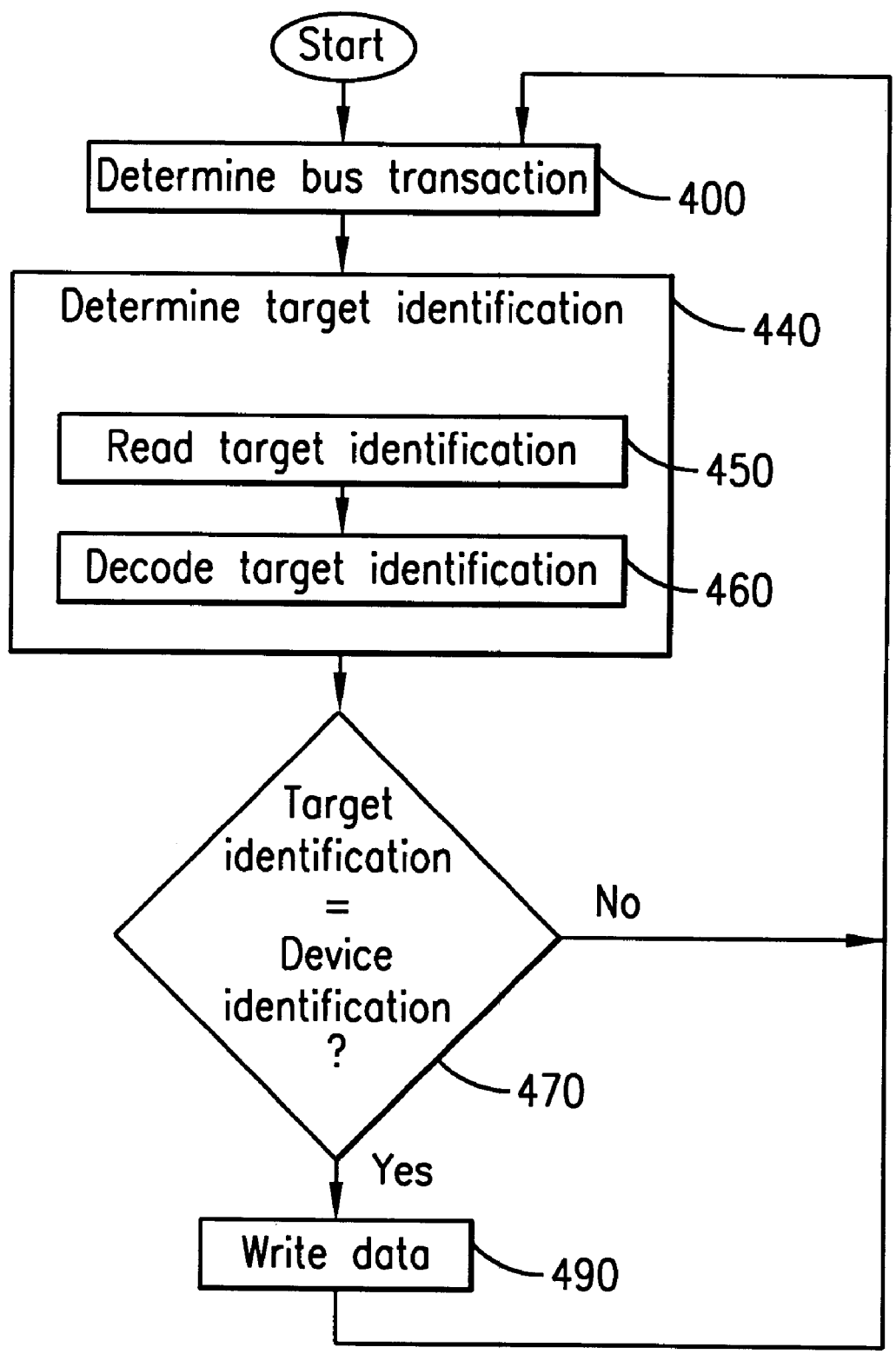
FIG. 3 is a flow diagram for effectuating multicasting on a computer system bus consistent with the apparatus described in FIG. 1 and the timing diagram described in FIG. 2.

Referring additionally now to FIG. 3, there is illustrated a flow diagram for effectuating multicasting on a computer system bus consistent with the apparatus described in FIG. 1 and the timing diagram described in FIG. 2. Each of the PCI devices 150A–N detect the beginning of a bus transaction (step 400) and determine the transaction command 340 (step 410). In the preferred embodiment, the PCI devices 150A–N determine the transaction command 340 by reading the transaction command 340 (step 420) from the multicast bus 165 and decoding the transaction command 340 (step 430).

The PCI devices 150A–N also determine the target identification (step 440) which in the preferred embodiment is accomplished by reading the target identification 350 (step 450) from the multicast bus 165 and decoding the target identification 350 (step 460). A determination is made as to whether the decoded target identification 350 matches the identity of the particular PCI devices 150A–N (step 470) and if so, a determination is made as to whether the decoded command 340 is a write data command (step 480).

If, in step 480, the decoded command 340 is a write data command then data is read from the PCI bus 160 and written into the particular PCI device 150A–N (step 490). If, in step 470, a determination is made that the target identification 350 does not match the identity of the particular PCI device 150A–N of if, in step 480, a determination is made that the command 340 is not a data write command, monitoring continues at step 400 to detect the beginning of a bus transaction.

Although the preferred embodiment of the apparatus and method of the present invention has been illustrated in the accompanying Drawings and described in the foregoing Detailed Description, it is understood that the invention is not limited to the embodiments disclosed, but is capable of numerous rearrangements, modifications and substitutions without departing from the spirit of the invention as set forth and defined by the following claims.

What is claimed is:

1. A computer system comprising:

a primary bus for transmission of a bus transaction to at least a primary device of a plurality of devices the bus transaction comprising address, data and control signals; and a multicast bus for transmitting synchronous with the bus transaction on the primary bus, command information and target identification information to the plurality of devices, the target identification information for identifying at least one secondary device in addition to the primary device to receive the data on the primary bus, and the command information for identifying the operation to be performed by the at least one secondary device on the data received from the primary bus during the bus transaction, wherein the multicast bus is different than the primary bus.

2. The computer system, as recited in claim 1, wherein the plurality of devices are located off of a motherboard.

3. The computer system, as recited in claim 1, wherein the multicast bus comprises:

a control line for identifying the initiation of the bus transaction on the primary bus; and a plurality of data lines for communicating the command information to the plurality of devices, the plurality of data lines further for communicating the target identification information to identify the at least one secondary device.

4. The computer system, as recited in claim 3, wherein the command information communicated on the multicast bus is encoded.

5. The computer system, as recited in claim 3, wherein each of the data lines of the plurality of data lines is associated with a distinct command.

6. The computer system, as recited in claim 3, wherein the target identification information communicated on the multicast bus is encoded.

7. The computer system, as recited in claim 3, wherein each of the data lines of the plurality of data lines is associated with a distinct device of the plurality of devices.

8. The computer system as recited in claim 3, wherein the primary bus is a PCI bus.

9. The computer system as recited in claim 8, wherein the control line is a frame# line of the PCI bus.

10. In a computer system comprising a primary bus and a multicast bus, the primary bus for transmission of a bus transaction wherein the bus transaction comprises data, address and control signals, the multicast bus for transmitting, synchronous with the bus transaction, command information and target identification information, a device for receiving multicast information on the multicast bus comprising:

an interface to the primary bus;

an interface to the multicast bus;

a decoder for decoding command information and target identification information received on the multicast bus; and a controller for reading data from the primary bus when the command information indicates a data write operation and the target identification information matches the device identity.

11. A method comprising the acts of:

detecting a beginning of a primary bus transaction on a primary bus, the primary bus transaction being destined for a primary device of a plurality of devices, the primary bus transaction comprising data, address and control signals;

determining a transaction command present on a multicast bus in response to detection of the beginning of the primary bus transaction the multicast bus for transmitting, synchronous with the bus transaction on the primary bus, command information and target identification information to the plurality of devices;

determining a secondary device identification present on the multicast bus in response to detection of the beginning of the primary bus transaction;

ascertaining whether the determined secondary device identification matches an identity of a secondary device;

ascertaining whether the determined transaction command is a write command; and writing data from the primary bus into the secondary device if it is ascertained that the determined secondary device identification matches the identity of the secondary device and that the determined transaction command is a write command.

12. The method, as recited in claim 11, wherein the act of determining the transaction command comprises the acts of:

reading data from the multicast bus during a multicast command cycle; and decoding the data from the multicast bus.

13. The method, as recited in claim 11, wherein the act of determining the secondary device identification comprises the acts of:

reading data from the multicast bus during a multicast bus target identification cycle; and decoding the data from the multicast bus.

14. The method, as recited in claim 11, wherein the primary bus comprises a PCI bus and the act of detecting the beginning of a primary bus transaction comprises detecting a high to low transition of a frame# signal line of the PCI bus.

15. A computer system, comprising:

a processor;

a primary bus for transmission of a bus transaction to at least a primary device of a plurality of devices, the bus transaction comprising address, data, and control signals; and a multicast bus for transmitting, synchronous with the bus transaction on the primary bus, command information and target identification information to the plurality of devices, the target information identifying at least one secondary device to receive the data on the primary bus, and the command information identifying the operation to be performed by the at least one secondary device on the data received from the primary bus during the bus transaction, wherein the processor is operatively connected to the primary bus and the multicast bus.

16. The computer system as recited in claim 15, comprising a memory operatively coupled to the processor.

17. The computer system as recited in claim 15, comprising a bridge device to operatively couple the processor to the primary bus and the multicast bus.

18. The computer system as recited in claim 17, wherein the bridge device comprises a host-to-PCI bridge.

19. The computer system as recited in claim 15, wherein the plurality of devices comprise input/output devices.

20. The computer system as recited in claim 15, wherein the primary device and the secondary device each comprises:

a first interface coupled to the primary bus;

a second interface coupled to the multicast bus; and a controller to read the data from the primary bus via the first interface, and to read the command information and the target identification information from the multicast bus via the second interface.

* * * * *